US006769736B2

(12) United States Patent
Roleder et al.

(10) Patent No.: US 6,769,736 B2
(45) Date of Patent: Aug. 3, 2004

(54) POSITIONING MECHANISM FOR A MASSAGE CHAIR

(75) Inventors: Jon W. Roleder, La Jolla, CA (US); William A. Martin, Carlsbad, CA (US); Paul M.G. Weiskopf, La Mesa, CA (US)

(73) Assignee: Earthlite Massage Tables, Inc., Vista, CA (US)

(*) Notice: Subject to any disclaimer, the term of this patent is extended or adjusted under 35 U.S.C. 154(b) by 14 days.

(21) Appl. No.: 09/992,690

(22) Filed: Nov. 13, 2001

(65) Prior Publication Data

US 2003/0090131 A1 May 15, 2003

(51) Int. Cl.[7] .................................................. B60N 2/38
(52) U.S. Cl. .............................. 297/195.11; 297/423.12
(58) Field of Search ....................... 297/195.11, 423.12, 297/423.11, 488, 338, 344.18; 248/287.1, 286.1, 285.1; 403/373, 327, 376, 380, 110

(56) References Cited

U.S. PATENT DOCUMENTS

| | | | | |
|---|---|---|---|---|
| 3,227,414 A | * | 1/1966 | Dean | 248/443 |
| 4,589,699 A | * | 5/1986 | Dungan | 297/423.12 |
| 5,177,823 A | * | 1/1993 | Riach | 5/636 |
| 5,401,078 A | * | 3/1995 | Riach | 297/423.11 |
| 5,427,436 A | * | 6/1995 | Lloyd | 297/408 |
| 5,762,402 A | * | 6/1998 | Gillotti | 297/423.11 |
| 5,961,179 A | * | 10/1999 | Dixon et al. | 297/173 |
| 5,971,485 A | * | 10/1999 | Clark | 297/423.12 |
| 6,065,808 A | * | 5/2000 | Tinsley | 297/423.11 |
| 6,397,414 B1 | * | 6/2002 | Lloyd | 5/622 |
| 6,412,738 B1 | * | 7/2002 | Bressler et al. | 248/176.1 |
| 2002/0067606 A1 | | 6/2002 | Lloyd | |

OTHER PUBLICATIONS

The www.stronglite.com web page is enclosed that illustrates a massage chair sold by Stronglite Incorporated under the trademark Ergo–Pro Massage Chair. A magazine Advertisement is also enclosed that illustrates the Ergo–Pro Massage Chair. The Applicants believe the John Lloyd has filed a patent application for the massage chair pictured in the magazine Advertisement. The Application may be assigned to Stronglite Incorporated.

* cited by examiner

*Primary Examiner*—Peter M. Cuomo
*Assistant Examiner*—Stephanie Harris
(74) *Attorney, Agent, or Firm*—James P. Broder; Steven G. Roeder

(57) ABSTRACT

A massage chair (10) includes a seat (50), a front upper support assembly (16), a first support surface (18) and a first positioning mechanism (20). The first positioning mechanism (20) movably secures the first support surface (18) to the front upper support assembly (16). The first positioning mechanism (20) includes a guide rail (24) that has a longitudinal axis (26), and a clamping assembly (27) having a rotational axis (28). In some embodiments, with a single adjustment, the clamping assembly (27) can move between a locked position that inhibits movement of the first support surface (18), and an unlocked position that allows movement of the first support surface (18) around the rotational axis (28) and along the longitudinal axis (26). The massage chair (10) can also include a second positioning mechanism (22) that movably secures a second support surface (75) to the front upper support assembly (16).

48 Claims, 6 Drawing Sheets

POSITIONING MECHANISM FOR A MASSAGE CHAIR

FIELD OF THE INVENTION

The present invention relates generally to massage chairs. More specifically, the present invention is directed to a massage chair with an adjustable positioning mechanism.

BACKGROUND

As the benefits of therapeutic massage are becoming more widely appreciated, more and more people are participating in therapeutic massage. The massage chair allows the patient to be resting in an upright position while receiving a massage. Naturally, individuals of all shapes and sizes will from time to time want to participate in such therapeutic massage. For this reason, the settings for the seat, knee pads, chest support, arms rests, and head rest should be adjustable to more effectively and comfortably accommodate the patient as well as the massage therapist.

Depending upon the area of the body being massaged, the size of the patient, and the type of massage being provided, both rotational and longitudinal adjustments may be necessary to particular chair surfaces. Existing massage chairs allow adjustment of the various padded surfaces using separate positioning mechanisms to control each type of movement. This use of separate positioning mechanisms can result in adjustments that are unnecessarily complicated and time-consuming.

In light of the above, there is a need for providing a reliable, simple, and efficient method to adjust various surfaces of the massage chair to best accommodate the patient and the massage therapist. Still another need exists to provide a device that allows for the simultaneous longitudinal and rotational adjustment of the required support surfaces. Yet another need exists to provide an adjustable massage chair that is relatively easy and cost effective to manufacture, assemble and use.

SUMMARY

The present invention is directed to a massage chair and a positioning mechanism that positions one or more support surfaces of the massage chair. The massage chair includes a seat, a front upper support assembly coupled to the seat, a first support surface, and a first positioning mechanism. The first positioning mechanism movably secures the first support surface to the front upper support assembly. The first positioning mechanism includes a guide rail coupled to the first support surface and a clamping assembly coupled to the front upper support assembly. The guide rail has a longitudinal axis, and the clamping assembly has a rotational axis. The clamping assembly selectively moves between a locked position that inhibits movement of the first support surface relative to the clamping assembly, and an unlocked position that allows rotation of the first support surface around the rotational axis and movement of the first support surface relative to the clamping assembly along the longitudinal axis. With this design, the first positioning mechanism allows movement of the first support surface both longitudinally and rotationally with a single adjustment.

As provided herein, for example, the first support surface can be a chest support or a head support.

The guide rail can also have a substantially square or diamond-shaped cross-section. The clamping assembly can include one or more guide receivers that are shaped to correspond to the shape and positioning of the guide rail. In addition, the clamping assembly can include a clamp pin positioned along the rotational axis. The clamp pin can extend through the guide rail substantially perpendicular to the longitudinal axis. In some embodiments, the guide rail includes opposing corners positioned on opposite sides of the longitudinal axis, with the clamp pin extending through the opposing corners of the guide rail.

In certain embodiments, the massage chair also includes the first positioning mechanism and a second positioning mechanism. The second positioning can movably secure a second support surface to the front upper support assembly.

The present invention is also directed to a method for adjusting the positioning of one or more support surfaces for a massage chair.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
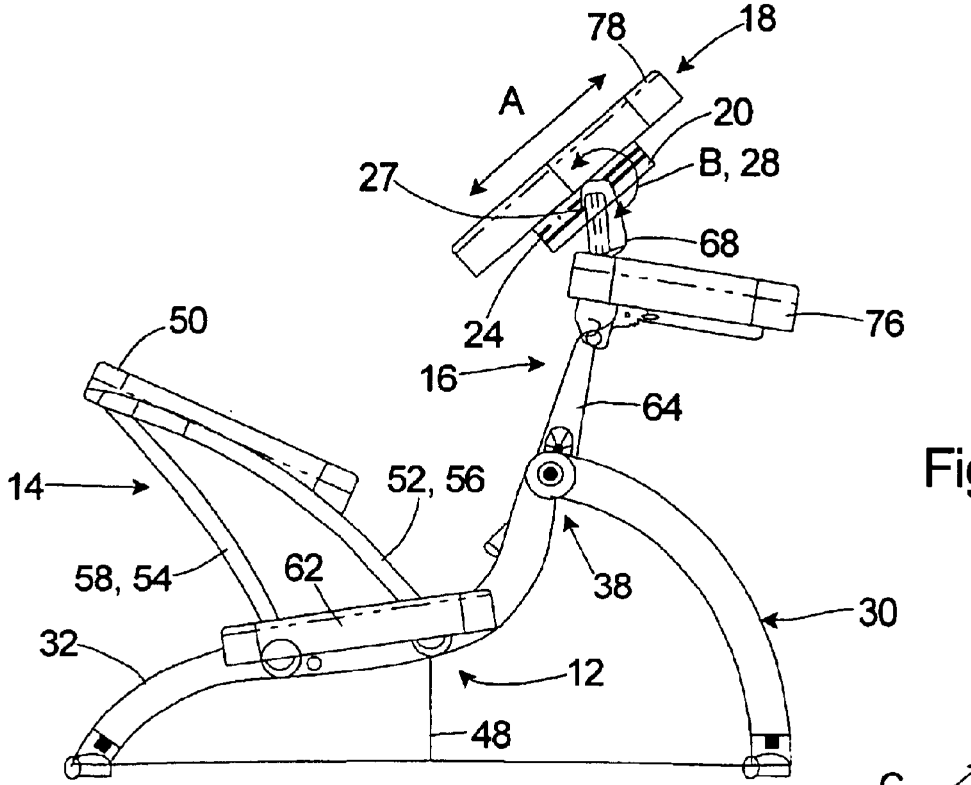
FIG. 1 is a side elevational view of a first embodiment of a massage chair having features of the present invention.
Figure 2:
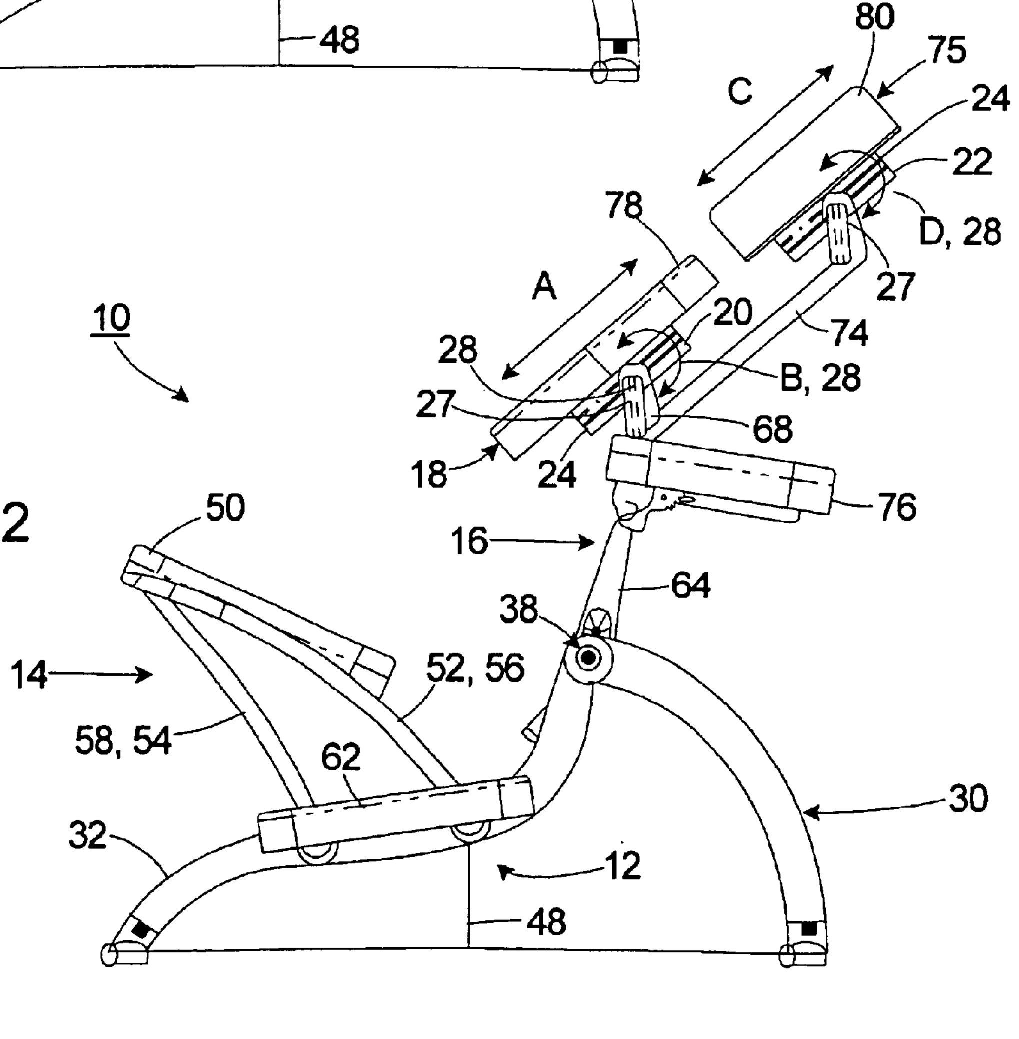
FIG. 2 is a side elevational view of a second embodiment of a massage chair having features of the present invention.

Referring initially to FIGS. 1 and 2, the present invention is directed to a massage device, such as massage chair 10 that can include (i) a lower support assembly 12, (ii) a seat assembly 14, (iii) a front upper support assembly 16, (iv) a first support surface 18, and (v) a first positioning mechanism 20 (also sometimes referred to herein generically as "positioning mechanism 20"). As explained in greater detail below, the massage chair 10 can also include a second positioning mechanism 22. The first positioning mechanism 20 movably secures the first support surface 18 to the front upper support assembly 16. The first positioning mechanism 20 includes a guide rail 24 having a longitudinal axis 26 (shown in phantom on FIG. 6B), and a clamping assembly 27 having a rotational axis 28. The clamping assembly 27 can move between a locked position that inhibits movement of the first support surface 18, and an unlocked position that allows rotation of the first support surface 18 around the rotational axis and movement of the first support surface 18 relative to the clamping assembly 27 along the longitudinal axis 26. With this design, the first positioning mechanism 20 allows for rotational and longitudinal movement of the first support surface 18 with a single adjustment.

Although the massage chair 10 illustrated in the Figures can be folded at specific locations for easy transport, it is noted that the features of the present invention can be incorporated into a massage chair 10 that folds in different locations than those shown, or does not fold at all. A detailed description of the various components of a foldable massage chair 10 is provided in U.S. patent application Ser. No. 09/731,037, entitled "Compact Foldable Massage Chair", filed on Dec. 5, 2000. The contents of U.S. patent application Ser. No. 09/731,037 are incorporated herein by reference. Accordingly, only the structural aspects of a massage chair 10 that are particularly significant to the present invention are provided in detail herein.

The positioning mechanism 20 is illustrated in a massage chair 10.

Alternately, for example, the positioning mechanism 20 can be used in other massage devices, such as a massage table.

The lower support assembly 12 supports the remainder of the massage chair 10. The design of the lower support assembly 12 can be varied to suit the design requirements of the massage chair 10. In the embodiments illustrated in the Figures, the lower support assembly 12 includes a front lower support 30 and a rear lower support 32. The design of the front lower support 30 can vary depending upon the requirements of the massage chair 10. The front lower support 30 can include a right front strut 34 and a left front strut 36 (illustrated in FIG. 3). Each of the front struts 34, 36 can extend between a connector 38 and the ground. Alternately, for example, the front lower support 30 can include more than two front struts 34, 36 or less than two front struts 34, 36.

Further, the front lower support 30 can include a laterally extending front lateral support 40. In this embodiment, the front lateral support 40 inhibits tipping of the massage chair 10 and provides lateral stability to the massage chair 10. Further, the front lateral support 40 can connect the front struts 34, 36 together. The front lateral support 40 can be made from a high strength and lightweight material, such as aluminum, as an example.

The design of the rear lower support 32 can be varied to suit the design requirements of the massage chair 10. The rear lower support 32 can include a right rear strut 42 and a left rear strut 44 (illustrated in FIG. 3). Each of the rear struts 42, 44 can extend rearwardly between the connector 38 and the ground. Alternately, for example, the rear lower support 32 can include more than two rear struts 42, 44 or less than two rear struts 42, 44. The rear lower support 32 can also include a laterally extending rear lateral support 46. In this embodiment, the rear lateral support 46 inhibits tipping of the massage chair 10 and provides lateral stability to the massage chair 10. Further, the rear lateral support 46 connects the rear struts 42, 44 together. The rear lateral support 46 can be made from a high strength and lightweight material, such as aluminum or other materials of suitable weight and strength.

The massage chair 10 can also include a flexible support 48 that extends between the front lower support 30 and the rear lower support 32. In the embodiment illustrated in FIG. 3, the flexible support 48 extends from near the front lateral support 40 to near the rear lateral support 46. In some embodiments, the flexible support 48 maintains the front lower support 30 from rotating farther away from the rear lower support 32 after the massage chair 10 is setup. A suitable flexible support 48 can be a flexible cable.

The seat assembly 14 is secured to the rear lower support 32 and allows for a patient to comfortably sit on the massage chair 10. The design of the seat assembly 14 can be varied depending upon the design requirements of the massage chair 10. In the embodiment illustrated in the Figures for example, the seat assembly 14 includes a seat 50, a forward seat support 52, and a rearward seat support 54.

The seat 50 can be made of a resilient pad, covered with cloth or any other cosmetically suitable, lightweight and durable material. Alternatively, for example, the seat 50 may be made by blow mold technology and covered with cloth or other such material. The position and/or height of the seat 50 in the upright position can be adjusted to suit the individual user. It is contemplated that the position of the seat 50 can be made to be adjustable.

The design of the forward seat support 52 can be varied to suit the design requirements of the massage chair 10. The forward seat support 52 can include one or more forward frames 56. The seat 50 is secured across the forward frames 56 near the distal end of each forward frame 56. As a result of this design, the seat 50 and the forward frames 56 can cantilever and pivot relative to the rear lower support 32.

Figure 3:
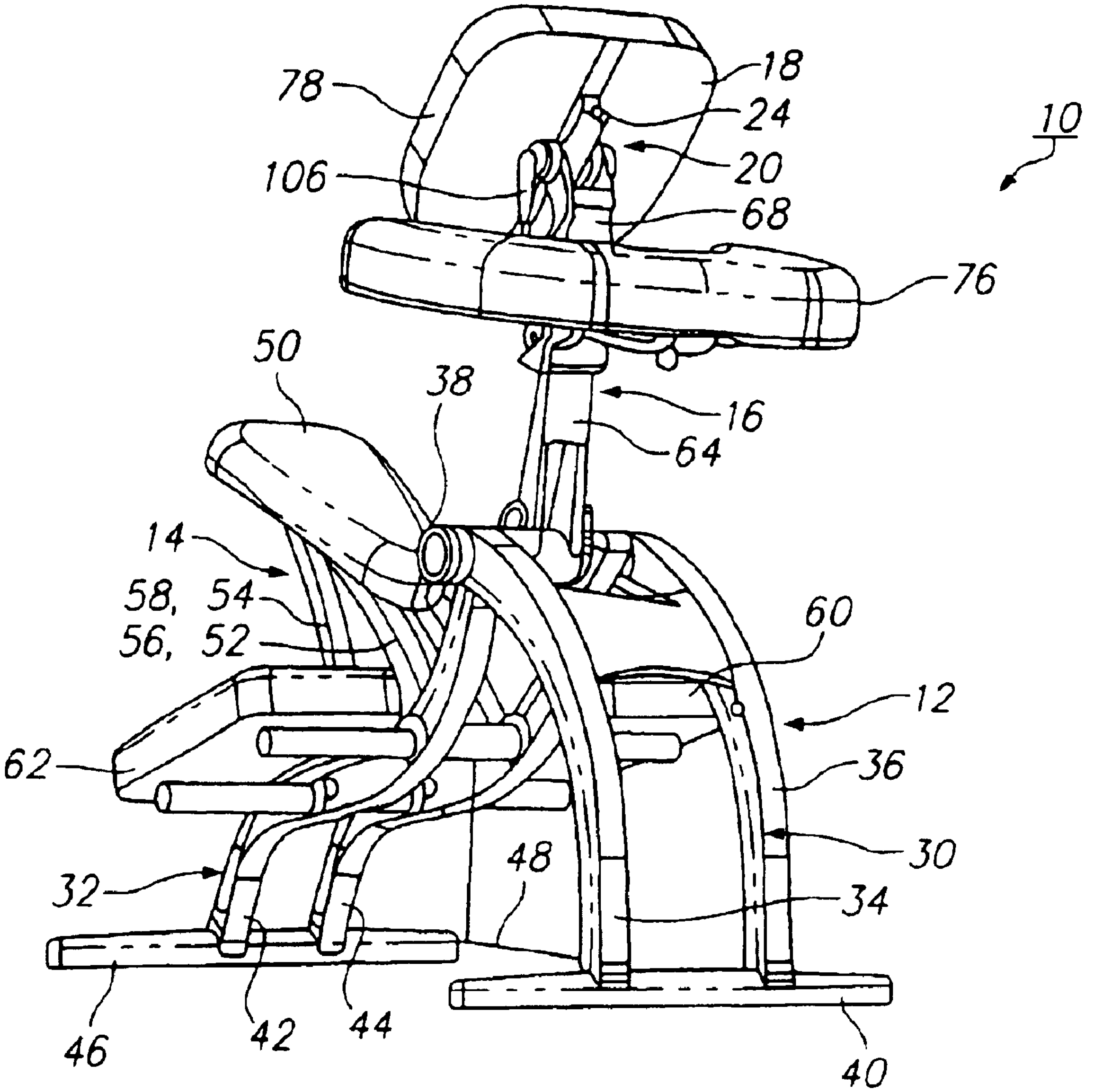
FIG. 3 is a perspective view of the massage chair illustrated in FIG. 1.

The design of the rearward seat support 54 can be varied to suit the design requirements of the massage chair 10. The rearward seat support 54 can include a rearward frame 58. For example, the rearward frame 58 can be pivotably secured to the forward frames 56 on one end, and can be coupled to the rear lower support 32 on the other end, as illustrated in FIG. 3. Alternately, for example, the rearward seat support 54 can include more than one rearward frame 58.

Figure 4A:
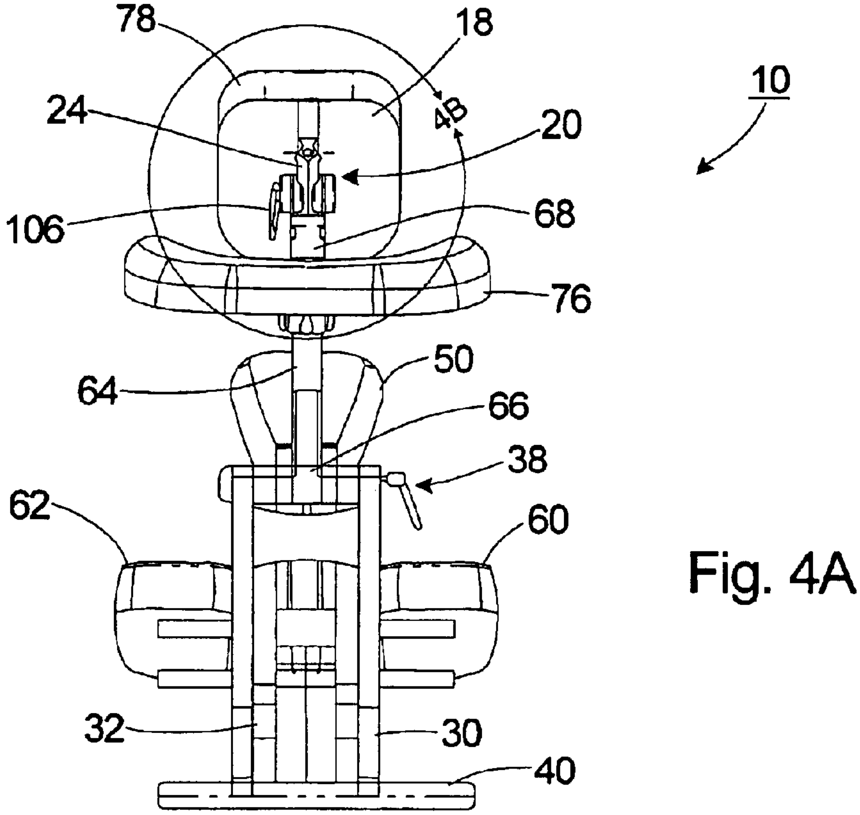
FIG. 4A is a front view illustration of the massage chair in FIG. 1.

As illustrated in FIGS. 3 and 4A, the massage chair 10 can also include a left knee pad 60 and a right knee pad 62 for supporting the front of the legs of the individual from the knee to the ankle. The left knee pad 60 and right knee pad 62 can be made of a resilient pad, covered with cloth or any other cosmetically suitable, lightweight and durable material. Alternatively, for example, each pad 60, 62 may be made by blow mold technology and covered with cloth or other such material. The left knee pad 60 and the right knee pad 62 can have a generally horizontal attitude. In some embodiments, the left knee pad 60 and the right knee pad 62 are approximately parallel to one another. However, the left knee pad 60 and right knee pad 62 do not need to be parallel for use in the present invention.

The design of the front upper support assembly 16 can be varied to suit the design requirements of the massage chair 10. In the embodiment illustrated in the Figures, the front upper support assembly 16 includes a single upper strut 64 that includes an upper attachment section 66. In the embodiment illustrated in the Figures, the upper attachment section 66 is a tubular shaped opening in the upper strut 64. As illustrated in FIG. 3, the upper strut 64 can be somewhat straight and extends generally upwardly and vertically from the connector 38. However, the desired orientation of the front upper support assembly 16 may be varied to suit the user. For instance, in this embodiment, the upper strut 64 is positioned between the front struts 34, 36 and between the rear struts 42, 44. Alternately, for example, the front upper support assembly 16 can include more than one upper strut 64.

Figure 6A:
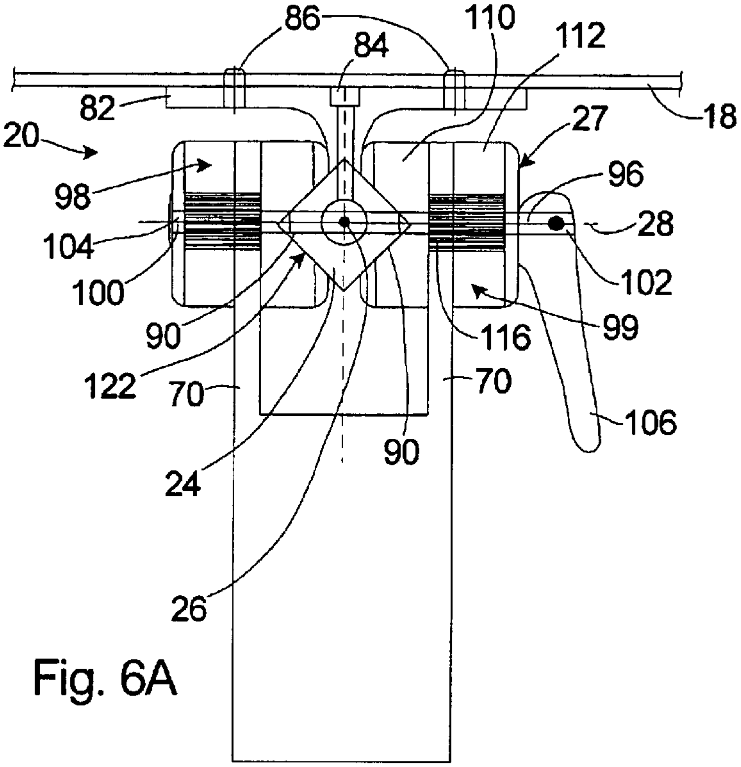
FIG. 6A is a simplified cross-sectional view of an embodiment of a portion of the massage chair including the first positioning mechanism, a portion of a front upper support assembly and a portion of a first support surface having features of the present invention.
Figure 6C:
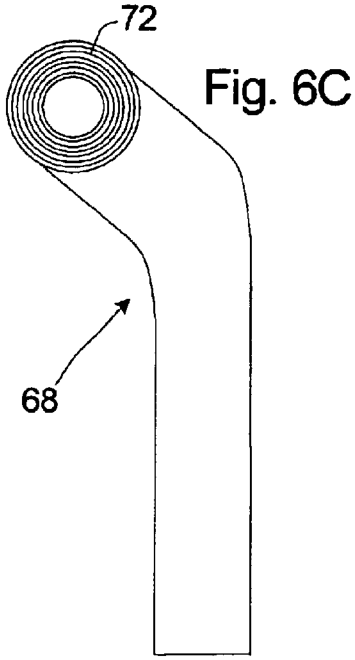
FIG. 6C is a side view illustration of a portion of the front upper support assembly in FIG. 6A.
Figure 6B:
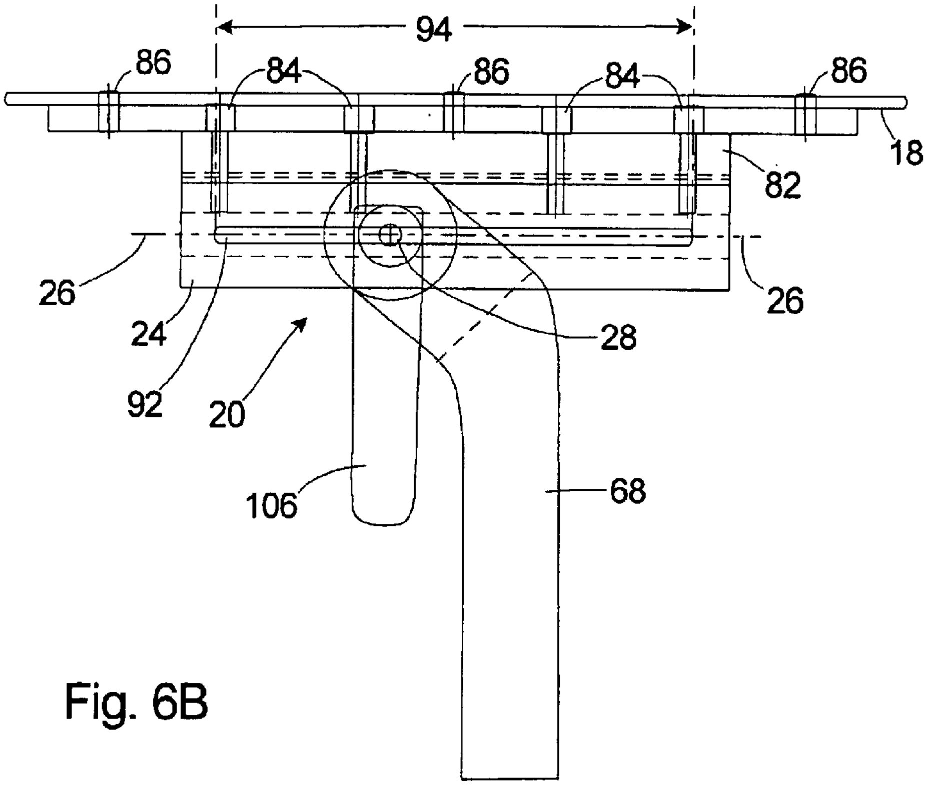
FIG. 6B is a side view illustration the portion of the massage chair in FIG. 6A.

In the embodiment illustrated in FIG. 1, the front upper support assembly 16 can include a first support arm 68 that supports the first support surface 18. One embodiment of the first support arm 68 is illustrated in FIGS. 6A–6C. The first support arm 68 can have one or more arm appendages 70 and can be coupled to the first positioning mechanism 20 as provided below. Each arm appendage 70 can vary depending upon the requirements of the first positioning mechanism 20 and the massage chair 10. Further, each arm appendage 70 can have one or more concentric appendage grooves 72 that interlock with the first positioning mechanism 20 in order to more efficiently immobilize the first support surface 18 when the first positioning mechanism 20 is in the locked position.

In an alternate embodiment, as explained more fully below, the front upper support assembly 16 can also include a second support arm 74 (shown in FIG. 2) that supports a second support surface 75. As a further alternative embodiment (not shown), the front upper support assembly 16 can include only a second support arm 74. As used herein, either support arm 68, 74 can be the first support arm 68 or the second support arm 74.

The massage chair 10 can also include an arm rest 76 that is adjustably secured to the front upper support assembly 16. The arm rest 76 is adapted for supporting the arms of an individual sitting in the massage chair 10. In the embodiment illustrated in the Figures, the arm rest 76 extends in a forward direction away from the front upper support assembly 16. The arm rest 76 can be made of a resilient pad, covered with cloth or any other cosmetically suitable, lightweight and durable material. Alternatively, for example, the arm rest 76 may be made by blow mold technology and covered with cloth or other such material.

As indicated above, the massage chair 10 also includes the first support surface 18 for supporting the patient. The design of the first support surface 18 can vary depending upon the design requirements of the massage chair 10. The first support surface 18 is coupled to the upper end of the front upper support assembly 16 with the first positioning mechanism 20. The first support surface 18 can be made of a resilient pad, covered with cloth or any other cosmetically suitable, lightweight and durable material. Alternatively, for example, the first support surface 18 may be made by blow mold technology and covered with cloth or other such material.

In some embodiments, the first support surface 18 can be a chest support 78. The chest support 78 faces rearwardly in a position for resting the chest of the individual. Additionally, a sternum pad (not shown) may be removably disposed on chest support to provide additional comfort and support, especially for women. Alternatively, for example, the first support surface 18 can be a head support 80 for supporting the head of the patient. Thus, necessary articulation of first support surface 18 is provided to accommodate trunk length size and position on the apparatus to afford comfort and proper support of the individual during massage, as described in greater detail below.

The supports 78, 80 can be made of a resilient pad, covered with cloth or any other cosmetically suitable, lightweight and durable material. Alternatively, for example, the chest support 78 and/or the head support 80 may be made by blow mold technology and covered with cloth or other such material.

Figure 4B:
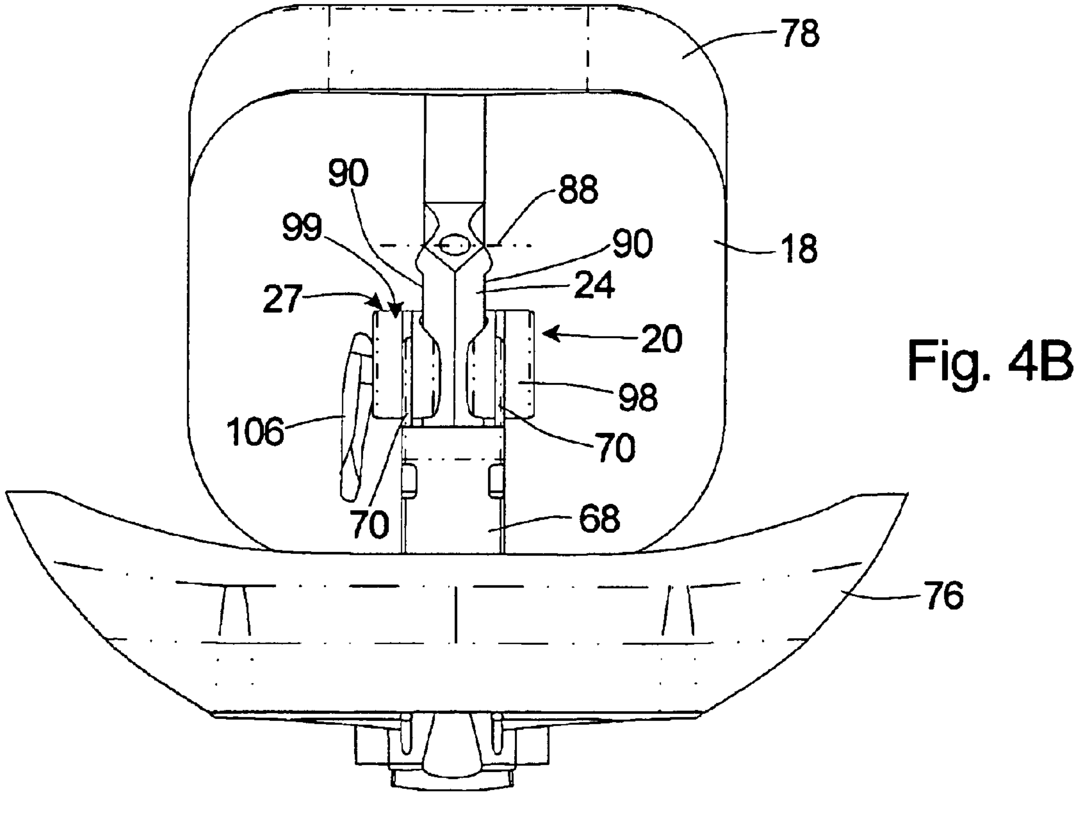
FIG. 4B is an enlarged view of a portion of the massage chair of FIG. 4A.
Figure 4C:
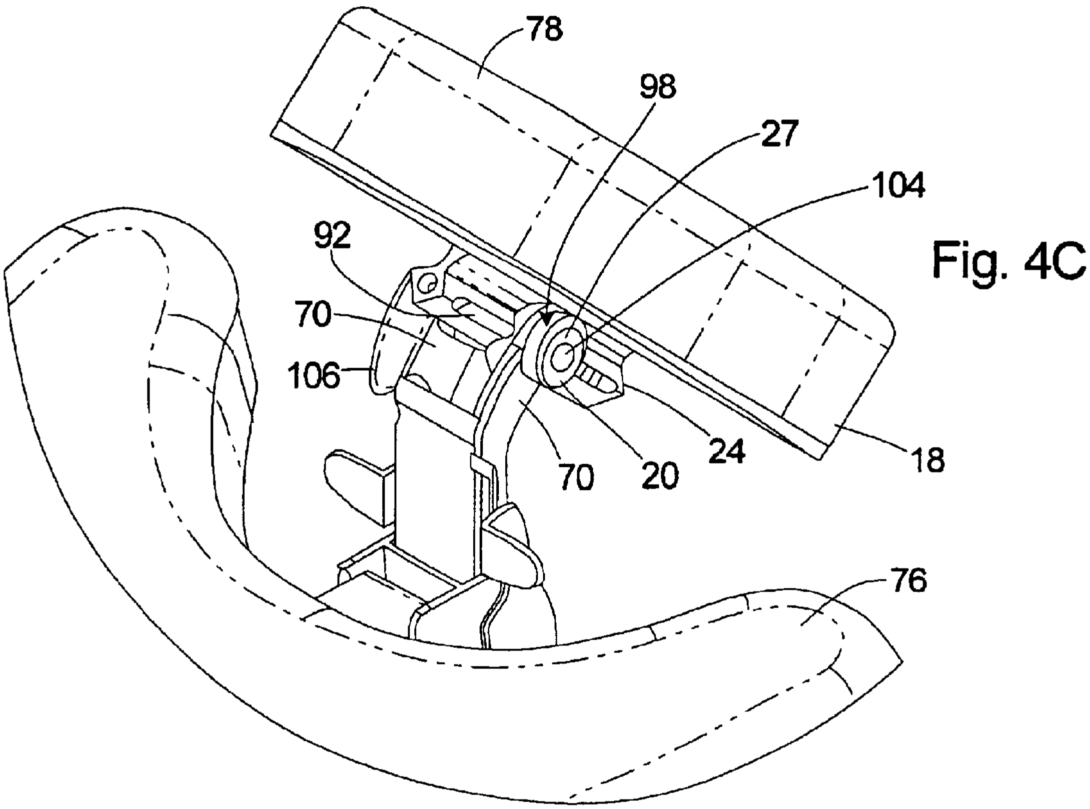
FIG. 4C is a perspective view of the portion of the massage chair illustrated in FIG. 4B.
Figure 5:
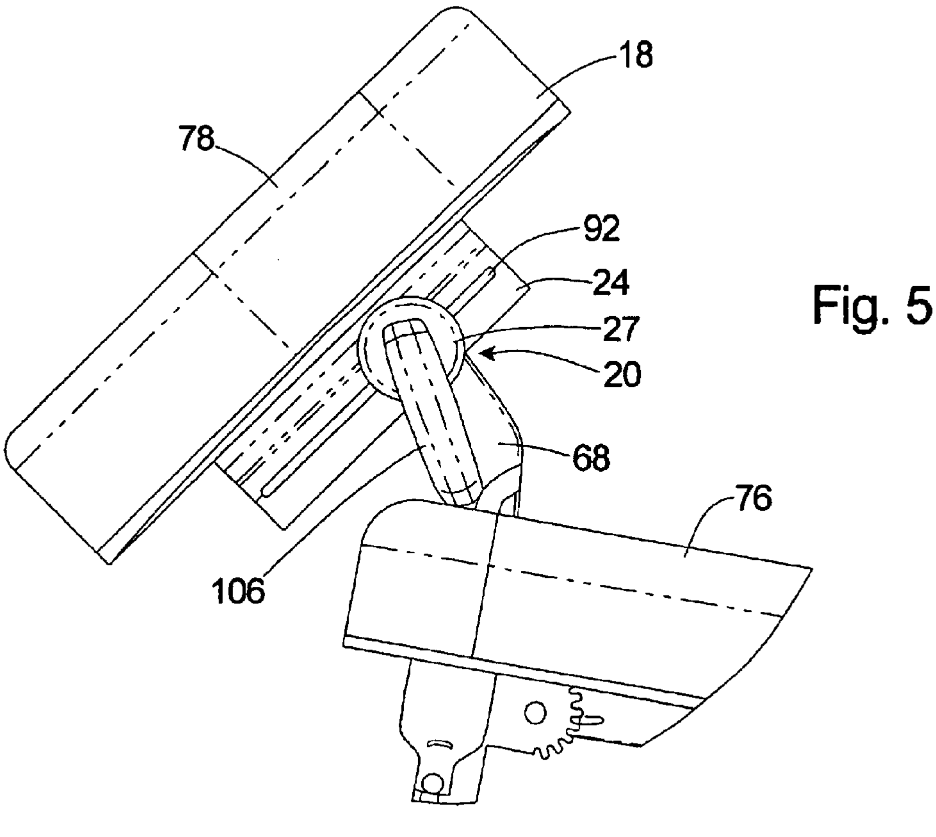
FIG. 5 is a side view illustration of a portion of the massage chair having features of the present invention.

Referring generally to FIGS. 4A–5, the first positioning mechanism 20 allows freedom of movement of the first support surface 18 in both the longitudinal and rotational directions relative to the front upper support assembly 16 with a single adjustment. The design of the first positioning mechanism 20 can vary depending upon the requirements of the first support surface 18 and the massage chair 10. In the massage chair 10 illustrated in the Figures, the first positioning mechanism 20 includes the guide rail 24 and the clamping assembly 27.

Referring to FIGS. 6A and 6B, the guide rail 24 guides movement of the first support surface 18 relative to the front upper support assembly 16. The number of guide rails 24 and the design of the guide rail 24 can be varied to suit the design requirements of the first support surface 18 and the massage chair 10. In the embodiments illustrated in the figures, the positioning mechanism 20 includes a single guide rail 24 that facilitates easy movement of the first support surface 18.

The guide rail 24 is coupled to the first support surface 18. In the embodiment shown in FIGS. 6A and 6B, the guide rail 24 is secured to a rail support 82 with one or more rail fasteners 84. The rail support 82 is secured directly to the first support surface 18 with one or more rail support fasteners 86, as shown in FIGS. 6A and 6B. Alternatively, the rail support 82 and the guide rail 24 can be formed as a unitary structure, which is secured to the first support surface 18.

As previously provided, the guide rail 24 includes the longitudinal axis 26 that is generally parallel with the first support surface 18. Further, the guide rail 24 includes a lateral axis 88 (shown in phantom on FIG. 4B) that is substantially perpendicular to the longitudinal axis 26, and is generally parallel to the first support surface 18. The guide rail 24 illustrated in the Figures has a substantially rectangular cross-section, which can be a square, for example. In the embodiment shown in FIG. 6A, the guide rail 24 is positioned to have a somewhat diamond-shaped cross-section relative to the first support surface 18. Stated another way, the guide rail 24 includes opposing corners 90 such that a line through the opposing corners 90 is generally parallel to the first support surface 18. Alternatively, the guide rail 24 can have a cross-section shaped in a different configuration, such as circular, triangular or oval, as examples.

The guide rail 24 can also include a guide rail slot 92 that extends through the lateral axis 88 of the guide rail 24. The design of the guide rail slot 92 can be varied. For example, the guide rail slot 92 can be generally rectangular shaped and can extend generally through the opposing corners 90 as illustrated in FIGS. 5A and 6A. The guide rail slot 92 can have a slot length 94 that extends along the longitudinal axis 26 of the guide rail 24. The slot length 94 can vary depending upon the desired amount of longitudinal adjustability in the support section 18 of the massage chair 10. As shown in FIG. 6B, the slot length 94 can extend along approximately ninety percent (90%) of the length of the guide rail 24. Alternatively, the slot length 94 can be more or less than ninety percent (90%) of the length of the guide rail 24. Still alternately, the guide rail slot 92 can be arc shaped. With this design, the guide rail 24 would move in an arc shaped path relative to the clamping assembly 27.

The guide rail 24 can be formed from a sufficiently strong and durable material such as metal, epoxy or plastic. Other suitably strong materials such as glass nylon can be incorporated into the guide rail 24, for example.

The clamping assembly 27 selectively clamps onto the guide rail 24. The design of the clamping assembly 27 can be varied to suit the design requirements of the guide rail 24 and the massage chair 10. The clamping assembly 27 includes the rotational axis 28 around which the first support surface 18 can rotate during adjustment of the massage chair 10. As illustrated in FIGS. 6A and 6B, the rotational axis 28 is generally perpendicular to the longitudinal axis 26 of the guide rail 24, and is substantially parallel to the first support surface 18. Referring to the embodiment illustrated in FIG. 6A, the clamping assembly 27 includes a clamp pin 96 and one or more guide receivers including a first guide receiver 98 and/or a second guide receiver 99.

In this embodiment, the clamp pin 96 is positioned substantially along the rotational axis 28 of the clamping assembly 27. The clamp pin 96 extends through the guide rail slot 92, and can slide along the length of the guide rail slot 92 during adjustment by the user. With this design, the first support surface 18 maintains a parallel orientation relative to the clamp pin 96, thereby inhibiting side-to-side motion of the first support surface 18. The clamp pin 96 can be formed from strong, durable materials such as aluminum or other metals, or plastics, as examples.

The clamp pin 96 has a first pin end 100 and a second pin end 102. The clamp pin 96 can also include a pin stop 104. In the embodiment shown in FIG. 6A, the pin stop 104 is positioned near the first pin end 100. The pin stop 104 is a generally flat "head" of the clamp pin 96 that maintains positioning of the clamp pin 96 within the guide rail slot 92. In addition, the pin stop 104 allows the clamping assembly 27 to "lock" and "unlock" movement of the guide rail 24, and thus, the first support surface 18. The second pin end 102 is opposite the first pin end 100. As provided below, the second pin end 102 is secured to a locking lever 106 that allows the user to adjust the positioning of the first support surface 18. Importantly, either end of the clamp pin 96 can be the first pin end 100 or the second pin end 102.

It should be noted that the length of the clamp pin 96 is sized so that the rotation of the locking lever 106 can apply the desired clamping pressure and tightly lock the guide rail 24. The length of the clamp pin 96 can be adjusted to alter the desired clamping pressure. The present design, allows the clamping assembly 27 to consistently provide the exact desired clamping pressure.

The clamp pin 96 extends through one or more guide receivers including the first guide receiver 98 and/or the second guide receiver 99. For example, FIGS. 4B and 6A include the first guide receiver 98 and the second guide receiver 99. Notably, either guide receiver 98, 99 can be the first guide receiver 98 or the second guide receiver 99. The design of the guide receivers 98, 99 can vary depending upon the requirements of the guide rail 24. For example, FIG. 4B illustrates an embodiment having the first guide receiver 98 and the second guide receiver 99. In this embodiment, each guide receiver 98, 99 is positioned adjacent to a corresponding opposing corner 90 of the guide rail 24. Further, each guide receiver 98, 99 is positioned to fit around the clamp pin 96, with the clamp pin 96 extending through a receiver aperture 108 in each guide receiver 98, 99. Alternatively, each clamping assembly 27 can include less than or more than two guide receivers 98, 99.

FIGS. 7A–8B illustrate one embodiment of a first guide receiver 98. As shown in the embodiments in FIGS. 6A and 7A–8B, each guide receiver 98, 99 includes an inner receiver portion 110 and an outer receiver portion 112. Each inner receiver portion 110 can include a generally circular receiver back 114, a receiver extension 116, and a receiver front side 118. Each receiver back 114 generally contacts a corresponding arm appendage 70 of the front upper support assembly 16.

Figure 7A:
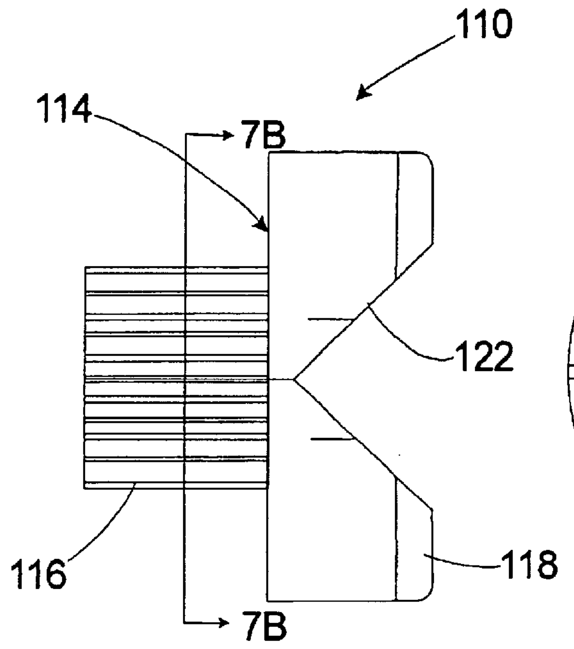
FIG. 7A is a side view of an embodiment of a portion of a guide receiver having features of the present invention.
Figure 7B:
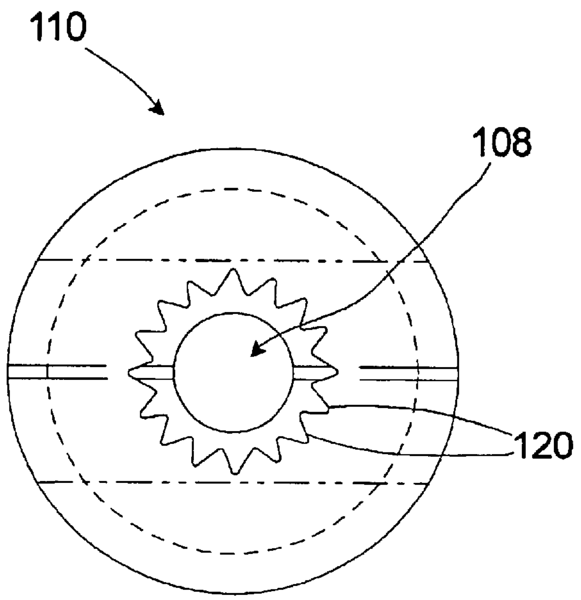
FIG. 7B is a cross-sectional view taken on line 7B—7B in FIG. 7A.
Figure 8A:
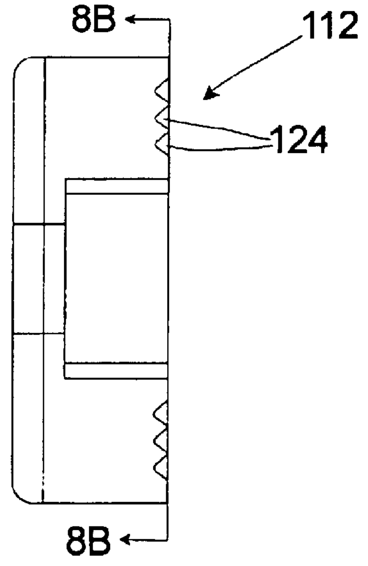
FIG. 8A is a side view of an embodiment of a portion of a guide receiver having features of the present invention.
Figure 8B:
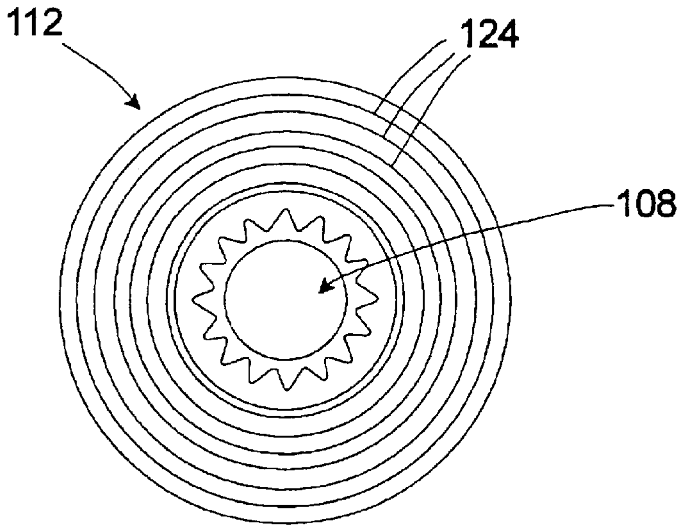
FIG. 8B is a cross-sectional view taken on line 8B—8B in FIG. 8A.

The receiver extension 116 extends through one of the arm appendages 70 of the front upper support assembly 16, and into one of the outer receiver portions 112. Each receiver extension 116 can include a plurality of splines 120 as best shown in FIG. 7B. The number and size of the splines 120 can vary. The splines 120 inhibit rotation of the guide receivers 98, 99 by interlocking with corresponding splines 120 of the outer receiver portion 112. Such rotation, if not avoided, could otherwise potentially cause unwanted movement of the first support surface 18 while the clamping assembly 27 is in the locked position.

The receiver front side 118 is adapted to receive a portion of the guide rail 24. The shape and size of the receiver front side 118 can vary depending upon the design requirements of the guide rail 24. When the clamping assembly 27 is in the locked position, the receiver front side 118 inhibits movement of the guide rail 24 relative to the front upper support assembly 16. The receiver front side 118 can have a shape that maximizes contact with the guide rail 24. For example, in the embodiment shown in FIGS. 4B and 7A, the receiver front side 118 includes a V-shaped notch 122 that corresponds to the shape of one of the opposing corners 90 of the guide rail 24. With this design, the rotational movement around the longitudinal axis 26 of the guide rail 24 is inhibited when the clamping assembly 27 is in the locked position. The shape of the notch 122 of each guide receiver 98, 99 can vary depending upon the shape of the guide rail 24.

The outer receiver portion 112 fits over the receiver extension 116 on the opposite side of the arm appendage 70 from the receiver front side 118. As indicated above, the outer receiver portion 112 can include one or more concentric receiver grooves 124 that interlock with the appendage grooves 72. In this manner, the surface area between the outer receiver portion 112 and the respective arm appendage 70 is increased. With this design, slippage between the guide receiver 98, 99 and the front upper support assembly 16 is minimized, thereby decreasing movement of the first support surface 18 relative to the front upper support assembly 16 while the clamping assembly 27 is in the locked position.

The guide receivers 98, 99 can be formed from a sufficiently strong and durable material such as metal or plastic. Other suitably strong materials such as glass nylon can be incorporated into the guide receivers 98, 99, for example.

The clamping assembly 27 can also include the locking lever 106 as stated previously. The design of the locking lever 106 can vary depending upon the requirements of the first positioning mechanism 20 and the massage chair 10. For example, the locking lever 106 can be a lever or a handle. However, any suitable configuration can be utilized with the present invention. The locking lever 106 is movably coupled to the clamp pin 96.

In the embodiment illustrated in FIG. 6A, the locking lever 106 is shown in the locked position, i.e. substantially perpendicular to the positioning of the clamp pin 96. In this embodiment, the locking lever 106 includes a cam area. In the locked position, the cam area of the locking lever 106 effectively "shortens" the length of the clamp pin 96, causing the pin stop 104 to be pulled toward the locking lever

106. The pin stop 104 and the locking lever 106 compress the guide receivers 98, 99 toward each other, thereby clamping each of the V-shaped notches 122 of the receiver front sides 118 onto a corresponding opposing corner 90 of the guide rail 24. Consequently, the guide rail 24 is inhibited from moving relative to the clamping assembly 27, and thus, the front upper support assembly 16, while the locking lever 106 is in the locked position.

The locking lever 106 can be repositioned to the unlocked position, i.e. substantially parallel to the positioning of the clamp pin 96. When in the unlocked position, the clamp pin 96 is effectively "lengthened", thereby allowing the pin stop 104 to release compression between the guide receivers 98, 99. This decrease in compression allows the guide rail 24 to slide relative to the V-shaped notches 122 of the receiver front sides 118. As a result, the first support surface 18 can move in a direction (indicated by directional arrow A on FIGS. 1 and 2) substantially parallel to the longitudinal axis 26 of the guide rail 24. In addition, in the unlocked position, the guide rail 24 can rotate around the clamp pin 96, generally around the rotational axis 28 of the clamping assembly 27. This rotation (shown on FIGS. 1 and 2 with directional arrow B) allows the first support surface 18 to tilt either toward or away from the patient, as necessary. Therefore, with a single adjustment, the first support surface 18 can quickly and easily be repositioned in two separate directions.

Alternately, the locking lever 106 can be design differently. For example, the locking lever 106 can include an internally threaded surface (not shown) and the clamp pin 96 can include an externally threaded surface (not shown). In this design, rotation of the locking lever 106 in one direction moves the positioning mechanism 20 to the locked position while rotation in the opposite direction moves the positioning mechanism to the unlocked position.

Referring now to FIG. 2, the massage chair 10 can include the second support surface 75. More specifically, the embodiment illustrated in FIG. 2 includes the first support surface, which can be the chest support 78, for example, and the second support surface which can be the head support 80. Because of the plurality of support surfaces 18, 75, both the first positioning mechanism 20 and the second positioning mechanism 22 can be incorporated into the massage chair 10. Importantly, either support surface 18, 75 can be the first support surface 18 or the second support surface 75.

The chest support 78 in this embodiment can be adjusted with the first positioning mechanism 20 as described above. The head support 80 can similarly be adjusted with the second positioning mechanism 22. As provided herein, the second positioning mechanism 22 can operate substantially similar to the first positioning mechanism 20, and include the same basic features and components, with the same possible variations as the first positioning mechanism 20 previously described and illustrated in FIGS. 6A–8B. With this design, in the unlocked position, the head support 80 can move both longitudinally (indicated by arrow C on FIG. 2), e.g. parallel to the longitudinal axis 26 of the guide rail 24, and can rotate (indicated by arrow D on FIG. 2) around the rotational axis 28 of the clamping assembly 27 of the second positioning mechanism 22. Importantly, either positioning mechanism 20, 22, can be the first positioning mechanism 20 or the second positioning mechanism 22.

As previously indicated, the second positioning mechanism 22 can be secured to the second support arm 74 of the front upper support assembly 16. The second support arm 74 can be movably attached to the upper strut 64 or the first support arm 68 depending upon the requirements of the massage chair 10.

In an alternate embodiment (not shown), the massage chair 10 can include the first support surface 18 which is the head support 80. In this embodiment, the head support 80 is coupled to the second support arm 74 of the front upper support assembly 16 with the first positioning mechanism 20. The first positioning mechanism 20 is configured and operates as described previously.

While the particular positioning mechanism 20 and massage chair 10 as shown and disclosed herein is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A massage chair adapted for seating an individual, the massage chair comprising:

a seat;

a front upper support assembly coupled to the seat;

a first support surface; and a first positioning mechanism that movably secures the first support surface to the front upper support assembly, the first positioning mechanism including (i) only one guide rail that is coupled to the first support surface, the guide rail having a substantially square cross-section, and (ii) a clamping assembly that is coupled to the front upper support assembly, the clamping assembly selectively moving between a locked position that inhibits movement of the first support surface relative to the clamping assembly, and an unlocked position that allows rotation of the first support surface relative to front upper support assembly and sliding of the first support surface relative to the front upper support assembly.

2. A massage chair adapted for seating an individual, the massage chair comprising:

a seat;

a front upper support assembly coupled to the seat;

a first support surface; and a first positioning mechanism that movably secures the first support surface to the front upper support assembly, the first positioning mechanism including:

a guide rail that is coupled to the first support surface, the guide rail having a longitudinal axis and a substantially diamond-shaped cross-section relative to the first support surface, the guide rail having opposing corners positioned on opposite sides of the longitudinal axis; and a clamping assembly that is coupled to the front upper support assembly, the clamping assembly releasably clamping the guide rail, the clamping assembly having a rotational axis, the clamping assembly including (i) a clamp pin positioned substantially along the rotational axis, the clamp pin being substantially perpendicular to the longitudinal axis of the guide rail, the clamp pin extending through the opposing corners of the guide rail substantially perpendicular to the longitudinal axis of the guide rail, the clamp pin having a first pin end and an opposing second pin end, (ii) a first guide receiver positioned near the first pin end and a second guide receiver positioned near the second pin end, the guide receivers each having a substantially V-shaped notch for receiving separate portions of the guide rail, the guide receivers selectively moving between a locked position that inhibits movement of the first support surface relative to the clamping assembly, and an unlocked position that allows rotation of the first support surface around the rotational axis and movement of the first support surface along the longitudinal axis of the guide rail relative to the guide receivers, and (iii) a locking lever that moves the guide receivers between the locked position and the unlocked position.

3. The massage chair of claim 2 wherein the first support surface is a chest support.

4. The massage chair of claim 2 wherein the first support surface is a head support.

5. A positioning mechanism that movably secures a first support surface to a support assembly, the positioning mechanism comprising:

a guide rail that is coupled to the first support surface, the guide rail having a substantially diamond-shaped cross-section relative to the first support surface; and a clamping assembly that is coupled to the support assembly, the clamping assembly releasably clamping the guide rail, the clamping assembly including (i) a clamp pin having a first pin end and an opposing second pin end, and (ii) a first guide receiver positioned near the first pin end and a second guide receiver positioned near the second pin end, the guide receivers each having a substantially V-shaped notch for receiving separate portions of the guide rail, the guide receivers selectively moving between a locked position that inhibits movement of the first support surface relative to the clamping assembly, and an unlocked position that allows rotation of the first support surface relative to the support assembly and sliding of the first support surface relative to the support assembly.

6. The positioning mechanism of claim 5 wherein the guide rail includes a longitudinal axis and opposing corners positioned on opposite sides of the longitudinal axis, and wherein the clamp pin extends through the opposing corners of the guide rail substantially perpendicular to the longitudinal axis, and wherein, in the unlocked position, the first support surface slides along the longitudinal axis.

7. The positioning mechanism of claim 5 further comprising a locking lever that moves the guide receivers between the locked position and the unlocked position.

8. A massage device that includes the positioning mechanism of claim 5.

9. A massage chair that includes the positioning mechanism of claim 5.

10. A massage chair adapted for seating an individual, the massage chair comprising:

a seat;

a front upper support assembly coupled to the seat;

a first support surface; and a first positioning mechanism that movably secures the first support surface to the front upper support assembly, the first positioning mechanism including (i) a guide rail that is coupled to the first support surface, and (ii) a clamping assembly that is coupled to the front upper support assembly, the clamping assembly including (a) a clamp pin having a first pin end and an opposing second pin end, and (b) a first guide receiver positioned near the first pin end and a second guide receiver positioned near the second pin end, at least one of the guide receivers having a substantially V-shaped notch that receives a portion of the guide rail, at least one of the guide receivers selectively moving between a locked position that inhibits movement of the first support surface relative to the clamping assembly and an unlocked position that allows rotation of the first support surface relative to front upper support assembly and sliding of the first support surface relative to the front upper support assembly.

11. The massage chair of claim 10 wherein each of the guide receivers has a substantially V-shaped notch that receives a corresponding portion of the guide rail.

12. A massage chair adapted for seating an individual, the massage chair comprising:

a seat;

a front upper support assembly coupled to the seat;

a first support surface; and a first positioning mechanism that movably secures the first support surface to the front upper support assembly, the first positioning mechanism including (i) a guide rail that is coupled to the first support surface, the guide rail having a longitudinal axis, and (ii) a clamping assembly that is coupled to the front upper support assembly, the clamping assembly including (a) a clamp pin having a first pin end and an opposing second pin end, the clamp pin extending through the guide rail substantially perpendicular to the longitudinal axis, and (b) a guide receiver positioned near the first pin end, the guide receiver selectively moving between a locked position that inhibits movement of the first support surface relative to the clamping assembly, and an unlocked position that allows rotation of the first support surface relative to front upper support assembly and sliding of the first support surface relative to the front upper support assembly.

13. The massage chair of claim 12 wherein the guide rail includes opposing corners positioned on opposite sides of the longitudinal axis, and wherein the clamp pin extends through at least one of the opposing corners of the guide rail.

14. A massage chair adapted for seating an individual, the massage chair comprising:

a seat;

a front upper support assembly coupled to the seat;

a first support surface; and a first positioning mechanism that movably secures the first support surface to the front upper support assembly, the first positioning mechanism including (i) a guide rail that is coupled to and centrally positioned relative to the first support surface, and (ii) a clamping assembly that is coupled to the front upper support assembly, the clamping assembly including (a) a clamp pin having a first pin end and an opposing second pin end, and (b) a guide receiver positioned near the first pin end, the guide receiver selectively moving between a locked position that inhibits movement of the first support surface relative to the clamping assembly, and an unlocked position that allows rotation of the first support surface relative to front upper support assembly and sliding of the first support surface relative to the front upper support assembly.

15. A method for adjusting the position of a first support surface for a massage chair, the method comprising the steps of:

coupling a guide rail having a longitudinal axis and a substantially diamond-shaped cross-section to the first support surface; and moving a clamping assembly having a rotational axis from a locked position that inhibits movement of the guide rail and the first support surface relative to the clamping assembly using two guide receivers that each has a substantially V-shaped notch that receives a separate portion of the guide rail, to an unlocked position that allows rotation of the guide rail and the first support surface around the rotational axis and movement of the guide rail and the first support surface relative to the clamping assembly along the longitudinal axis.

16. A massage chair adapted for seating an individual, the massage chair comprising:

a seat;

a front upper support assembly coupled to the seat;

a first support surface; and a first positioning mechanism that movably secures the first support surface to the front upper support assembly, the first positioning mechanism including (i) a guide rail that is coupled to the first support surface, and (ii) a clamping assembly that is coupled to the front upper support assembly, the clamping assembly including two guide receivers that receive the guide rail, the guide receivers being positioned on substantially opposite sides of the guide rail, the guide receivers selectively moving between a locked position that inhibits movement of the first support surface relative to a portion of the clamping assembly, and an unlocked position that allows rotation of the first support surface relative to the front upper support assembly and sliding of the first support surface relative to the guide receivers.

17. The massage chair of claim 16 wherein the guide rail has a longitudinal axis and the clamping assembly includes a rotational axis that is substantially perpendicular to the longitudinal axis, and wherein in the unlocked position the first support surface rotates around the rotational axis and slides along the longitudinal axis.

18. The massage chair of claim 16 wherein the guide rail has a substantially square cross-section.

19. The massage chair of claim 16 wherein the guide rail has a substantially diamond-shaped cross-section.

20. The massage chair of claim 16 wherein the clamping assembly includes a clamp pin having a first pin end and an opposing second pin end, wherein the first guide receiver is positioned near the first pin end, and the second guide receiver is positioned near the second pin end.

21. The massage chair of claim 20 wherein the guide rail includes a longitudinal axis and the guide rail is positioned so that the clamp pin extends through the guide rail substantially perpendicular to the longitudinal axis.

22. The massage chair of claim 20 wherein the guide rail includes opposing corners positioned on opposite sides of the longitudinal axis, and wherein the clamp pin extends through at least one of the opposing corners of the guide rail.

23. The massage chair of claim 20 wherein the guide rail includes a guide rail slot that is positioned substantially longitudinally along the guide rail and the clamp pin extends through the guide rail slot.

24. The massage chair of claim 16 wherein at least one of the guide receivers has a substantially V-shaped notch that receives a portion of the guide rail.

25. The massage chair of claim 16 wherein each of the guide receivers has a substantially V-shaped notch that receives a separate portion of the guide rail.

26. The massage chair of claim 16 wherein the first positioning mechanism includes a locking lever that moves at least one of the guide receivers between the locked position and the unlocked position.

27. The massage chair of claim 16 wherein the positioning mechanism includes exactly one guide rail.

28. The massage chair of claim 16 wherein the first support surface is a chest support.

29. The massage chair of claim 16 wherein the first support surface is a head support.

30. A massage chair adapted for seating an individual, the massage chair comprising:

a seat;

a front upper support assembly coupled to the seat;

a first support surface; and a first positioning mechanism that movably secures the first support surface to the front upper support assembly, the first positioning mechanism including (i) only one guide rail that is coupled to the first support surface, and (ii) a clamping assembly that is coupled to the front upper support assembly, the clamping assembly including a single locking lever, wherein movement of the locking lever moves the clamping assembly between a locked position that inhibits movement of the first support surface relative to the clamping assembly, and an unlocked position that allows rotation of the first support surface relative to front upper support and sliding of the first support surface relative to the front upper support assembly.

31. The massage chair of claim 30 wherein the guide rail has a longitudinal axis, and the first support surface slides in a direction that is parallel to the longitudinal axis when the clamping assembly is in the unlocked position.

32. The massage chair of claim 30 wherein the guide rail has a longitudinal axis and the clamping assembly includes a rotational axis that is substantially perpendicular to the longitudinal axis, and wherein in the unlocked position the first support surface rotates around the rotational axis and slides along the longitudinal axis.

33. The massage chair of claim 30 wherein the guide rail has a substantially square cross-section.

34. The massage chair of claim 30 wherein the guide rail has a substantially diamond-shaped cross-section.

35. The massage chair of claim 30 wherein the clamping assembly includes (i) a clamp pin having a first pin end and an opposing second pin end, and (ii) a guide receiver positioned near the first pin end, the guide receiver selectively moving between the locked position and the unlocked position.

36. The massage chair of claim 35 wherein the guide rail includes a longitudinal axis and the guide rail is positioned so that the clamp pin extends through the guide rail substantially perpendicular to the longitudinal axis.

37. The massage chair of claim 36 wherein the guide rail includes opposing corners positioned on opposite sides of the longitudinal axis, and wherein the clamp pin extends through the opposing corners of the guide rail.

38. The massage chair of claim 35 wherein the guide rail includes a guide rail slot that is positioned substantially longitudinally along the guide rail and the clamp pin extends through the guide rail slot.

39. The massage chair of claim 35 wherein the clamping assembly includes a second guide receiver that is positioned near the second pin end.

40. The massage chair of claim 39 wherein at least one of the guide receivers has a substantially V-shaped notch that receives a portion of the guide rail.

41. The massage chair of claim 30 wherein the first support surface has a longitudinal axis, and wherein the guide rail is positioned substantially along the longitudinal axis of the first support surface.

42. The massage chair of claim 30 wherein the first support surface is a chest support.

43. A method for adjusting the position of a first support surface for a massage chair, the first support surface having a longitudinal axis, the method comprising the steps of:

positioning a guide rail medially along the first support surface; and moving a single locking lever to move a clamping assembly having a rotational axis between a locked position that inhibits movement of the guide rail and the first support surface relative to the clamping assembly, and an unlocked position that allows rotation of the guide rail and the first support surface around the rotational axis and movement of the guide rail and the first support surface relative to the clamping assembly substantially along the longitudinal axis of the first support surface.

44. The method of claim 43 wherein the step of moving the locking lever includes receiving the guide rail with two guide receivers, each guide receiver having a substantially V-shaped notch that receive separate portions of the guide rail.

45. The method of claim 44 wherein the guide rail is positioned substantially between the two guide receivers.

46. The method of claim 43 wherein the step of fixedly securing includes securing the guide rail substantially medially along the first support surface.

47. The method of claim 43 wherein the step of fixedly securing includes fixedly securing exactly one guide rail to the first support surface.

48. The method of claim 43 further comprising the step of extending a clamp pin of the clamping assembly through a guide rail slot in the guide rail so that the guide rail slidingly moves relative to the clamp pin.

* * * * *